Jan. 24, 1939.　　　P. G. A. LEVASSEUR　　　2,144,927
VARIABLE PITCH AIRPLANE PROPELLER
Filed Dec. 7, 1935　　　9 Sheets-Sheet 1

INVENTOR
Pierre Georges Albert Levasseur
BY
ATTORNEYS

Fig. 5

Patented Jan. 24, 1939

2,144,927

UNITED STATES PATENT OFFICE 2,144,927

VARIABLE PITCH AIRPLANE PROPELLER

Pierre Georges Albert Levasseur, Paris, France

Application December 7, 1935, Serial No. 53,312
In France March 9, 1935

9 Claims. (Cl. 170—163)

The present invention relates to a propeller in which each of the blades can assume at least two different positions relative to the hub portion and if desirable, intermediate positions therebetween, it being understood that for each position assumed by the blades a different propeller pitch results.

According to my invention, the blades of the propeller are mounted on the hub in such fashion that centrifugal force always tends to return them automatically to one of two extreme positions, for example, the position of smallest pitch. The other of its two extreme positions, for example, the position of greatest pitch, may be so designed that the blades lock in such position by means of any suitable locking device and when initially placed in such position of greatest pitch a release of the locking means during a rotation of the propeller in flight will result in an instant return of the propeller blades to the position of smallest pitch through the action of centrifugal force. If, on the other hand, suitable stops have been actuated, the blades can be caused to assume any desired intermediate position through the operation of centrifugal force and maintain such intermediate position until further released.

The movement of the blades in the opposite direction against the action of centrifugal force is accomplished after preferably reducing the speed of the motor by means of a control mechanism which in turn derives its energy from the actual energy of the moving blades.

The invention relates, in addition to a method of controlling the pitch of propeller blades, to the structure for accomplishing such control which is characterized by great simplicity and dependability in operation. Other characteristics and advantages of the invention will become apparent from the following description, taken in conjunction with the accompanying drawings, which show one embodiment of the invention.

With these and other objects in mind, reference is had to the attached sheets of drawings illustrating one practical embodiment of the invention, and, in which

Figs. 10 to 12 are a diagrammatic representation of the propeller in three pitch positions;

In Figs. 1 to 7 there is shown a propeller having two blades, I and Ia, it being understood that the invention is applicable under the same condition to a propeller having any number of blades. Each of the blades of the propeller is mounted under identical conditions and embodies the same structure and under those circumstances the invention will be described with reference to one of the blades only, for example, blade I. This blade is internally screw-threaded at its inner end, (as shown at 5) to cooperate with a threaded bearing 2 formed on the hub collar 3, which in turn is fixedly mounted on the propeller shaft 4. The pitch and cross-section of the internal screw threads 5 in the propeller blade are such that under the action of the centrifugal force acting on the blades during flight the blade I tends to unscrew itself with respect to its hub. It is, of course, apparent that by means of a screwing or unscrewing movement of the blade its pitch with respect to its hub can be varied from a position of great pitch to one of small pitch. The hub 3 carries a control plate 6, which is loosely mounted thereon, and which in turn has a cam surface 7 for each blade of the propeller.

Figure 7:
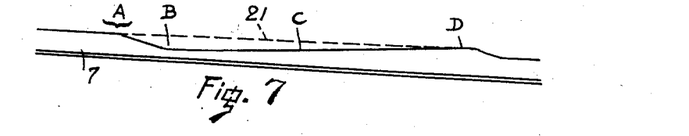
Fig. 7 is a diagram showing the development of the control cam which forms a part of my invention.

In the case of a two bladed propeller, the cam surfaces are diametrically opposite each other on the plate and the contour of one of them is shown on a large scale in Fig. 7.

On the blade is mounted a collar 8, which may be secured in position by any appropriate means, for example, through the clamping lugs 9. Said collar in addition also carries a bracket 10, through which is fixed a stem 11, of a forked member 12, the latter carrying a roller 13, which is pivotally secured therein, and which cooperates with the cam surface of the cam 7.

The details of construction, and the relative positions of said roller and its forked member with relation to the mechanism as a whole, are shown in Figs. 1 through 5. Fig. 6 shows in cross-section the component parts of said roller assembly. The action of centrifugal force, which in the case of my invention constantly tends to unscrew the propeller blade during rotation of the latter, is partially compensated for by the action of a suitable retracting means, which in turn tends to screw said blade up again on its hub.

In the embodiment here illustrated, the retracting means has an elastic cord 14 which is secured at one of its ends to said collar 8 by means of engagement with the stem 11, of the fork 12, and at its opposite end to a bracket or supporting member 15, carried by the propeller hub. As illustrated, the elastic cord may be secured to the bracket 15 through the medium of a pin 16, which passes through one end of said elastic cord.

Figures 8, 9:
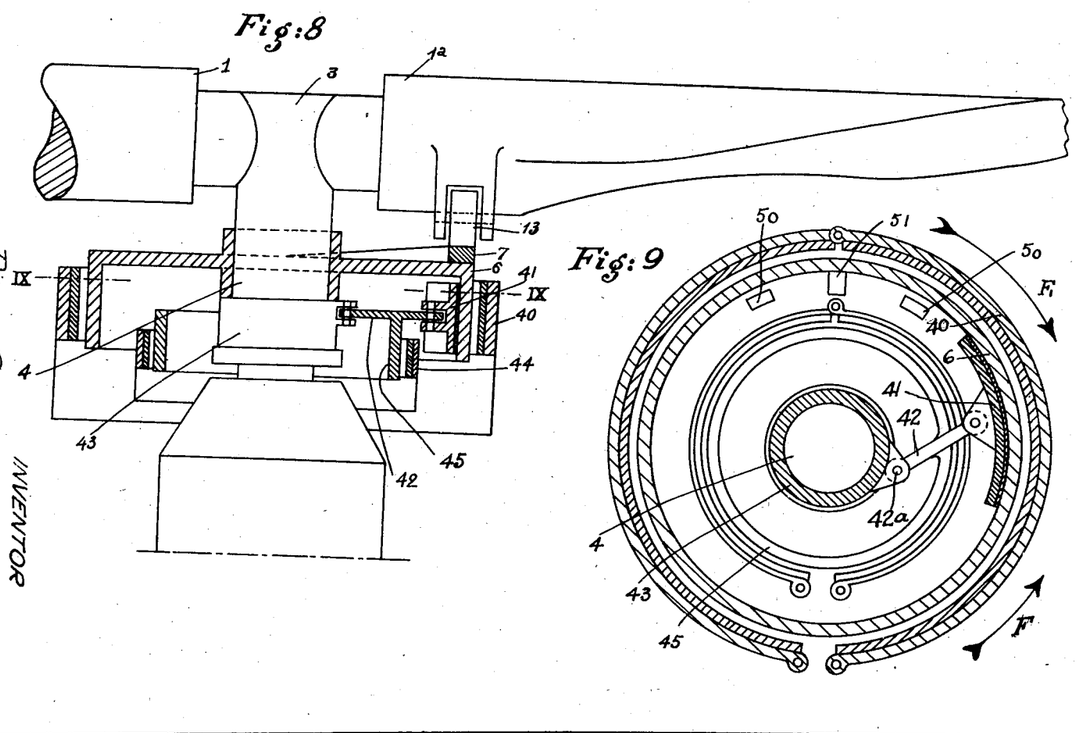
Fig. 8 is a side elevation partially in section of a propeller hub embodying my invention.
Fig. 9 is a corresponding plan view in cross-section along the lines IX—IX of Fig. 8.

In operation, the plate 6 normally rotates freely with the hub 3 without any relative displacement with respect to the latter. Such a relative movement can, however, be set up and the pitch of the blades controlled by effecting a braking action on said plate 6, by means of any well known type of brake, as for example, the internal shoe friction brake 40 as shown in Figs. 8 and 9.

Figure 1:
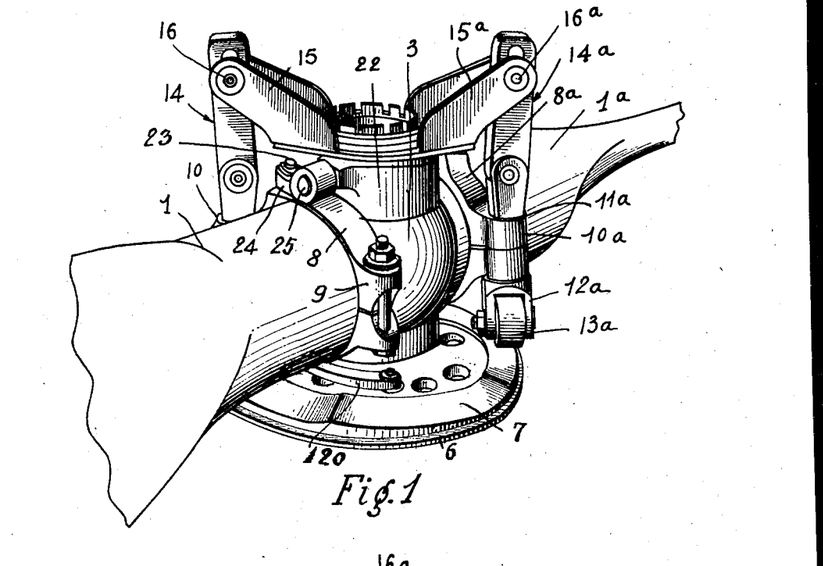
Fig. 1 is a perspective view of a propeller embodying one form of my invention.
Figure 2:
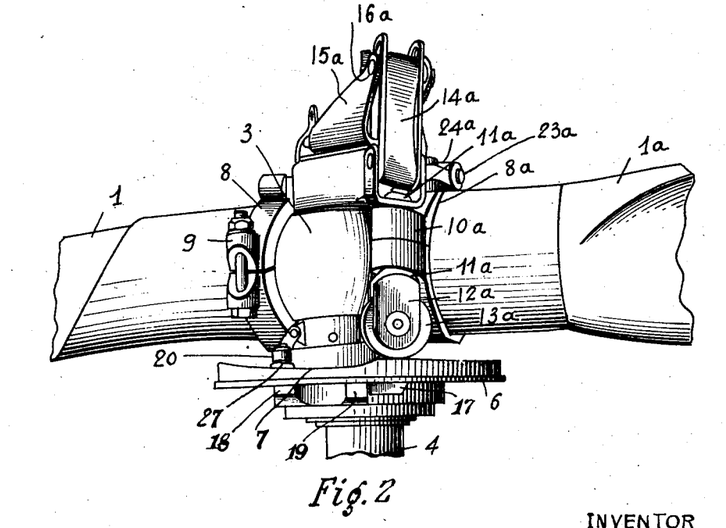
Fig. 2 is a side elevation of the propeller shown in Fig. 1.
Figures 3, 6:
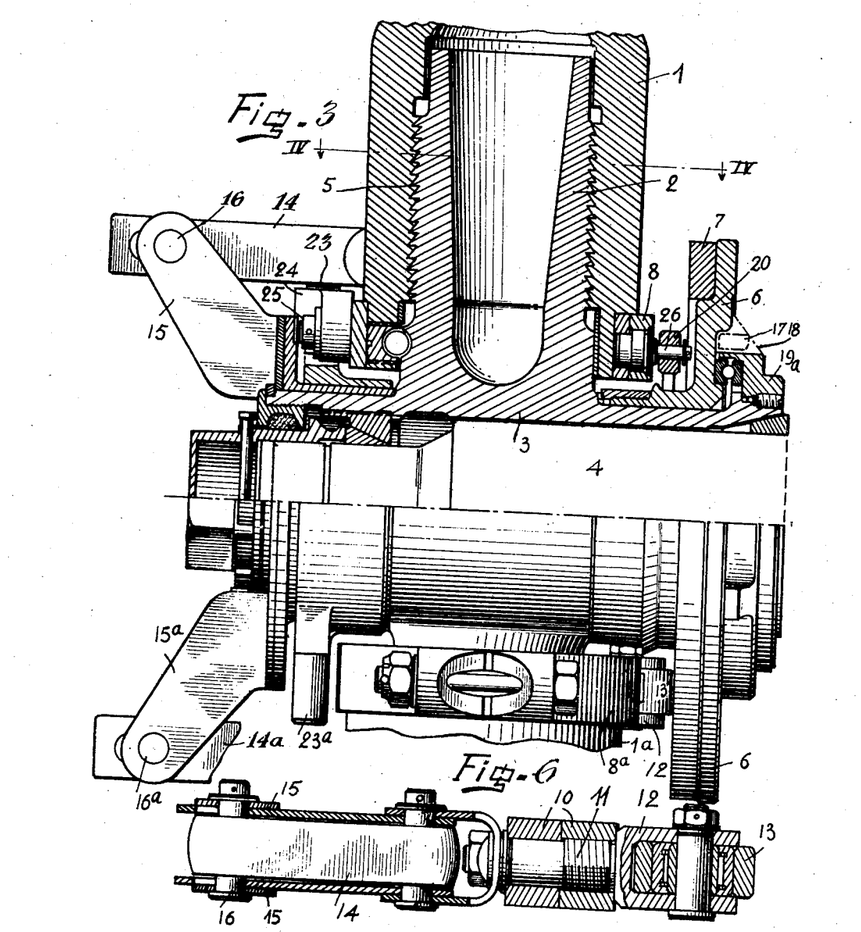
Fig. 3 is an enlarged side elevation of the propeller hub shown in the preceding views and illustrated partially in cross-section to disclose the details of mounting of one of the blades of the propeller.
Fig. 6 shows a constructional detail in section taken along the lines VI—VI of Fig. 5.
Figure 4:
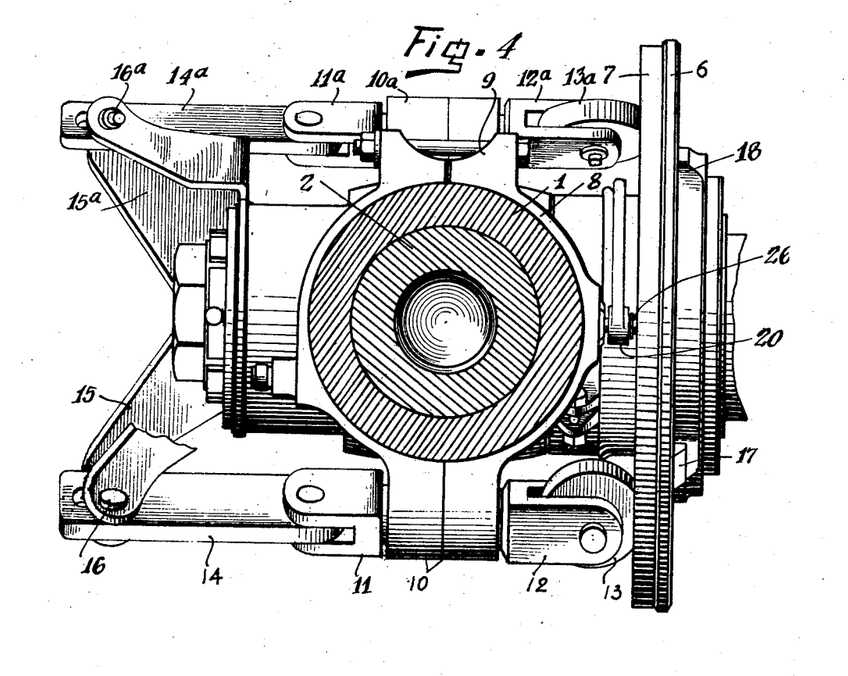
Fig. 4 is a further side elevation taken along the lines IV—IV of the propeller hub illustrated in Fig. 3 and showing a further cross-section of one of the blade socket mountings.
Figure 5:
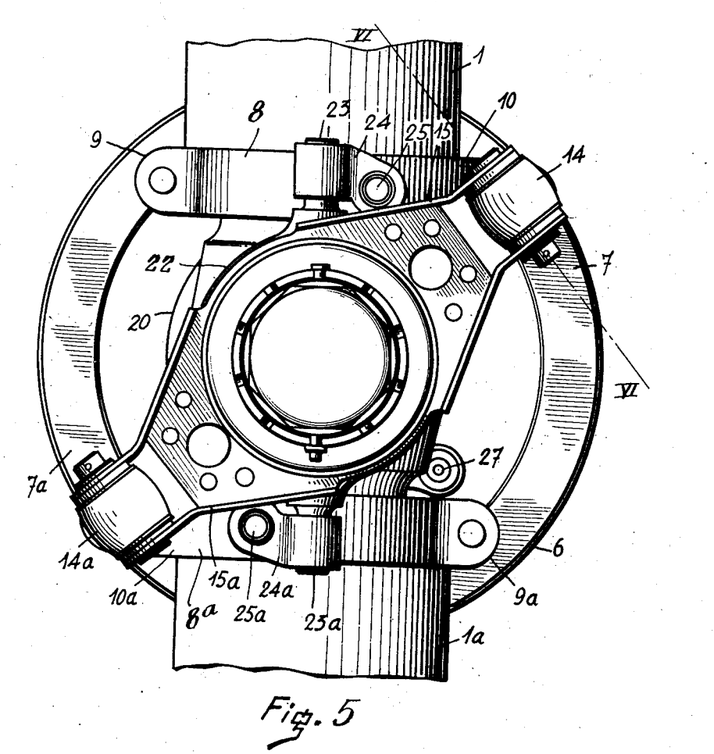
Fig. 5 is a plan view taken from the top of the propeller hub illustrated in Figs. 1 and 2.

The movement of the plate 6, relative to the hub 3, is limited in both directions by the stops 17 and 18 carried by the hub, and cooperating with the stop 19, carried by the plate, as shown in Figs. 2 and 4. In addition, a suitable retracting means, such as a further elastic cord 20, constantly tends to bring the plate 6 back into the position shown in Fig. 5 (which is the position of greatest pitch), and in which the projection 17, keys against the stop 19. The elastic cord 20, is secured at one end to a pin 26, carried by the collar 8, and at its other end by a pin 27, carried by the plate 6.

In use, the above described propeller functions as follows:

It will be assumed in the first place that the blade 1 is in the position of greatest pitch, which, for example, might be the blade screwed home on the hub portion 2. In this position, the plate takes the position shown in Figs. 2 and 5 and the stop 19 is in contact with the stop 17. In this position, the roller 13 is in contact with the bearing surface A of the collar 7 (see Fig. 7). When it is desired to bring the blade into the position of smallest pitch, a brake 40 (see Fig. 9) is applied to the plate 6. If it is then assumed that the propeller shaft rotates in the direction of the arrow F in Fig. 9, the blade effects, owing to said brake, a relative displacement with respect to the hub 4, in the direction of the arrow F', and the roller 13 comes to rest in the recess B of the cam (see Fig. 7). Under the action of centrifugal force, the blade 1 then unscrews itself, that is to say, it effects with its collar 8, slight angular displacement, the roller 13 continuing meanwhile to press against the bottom of the recess B. This will bring the blade automatically into the position of least pitch by the action of centrifugal force alone and without it being necessary to modify the speed of rotation of the engine.

When subsequently it is desired to bring the blade into the position of greatest pitch, it will suffice to apply the brake to the plate 6, until the roller 13 reaches position D on the cam 7 (see Fig. 7). As the roller 13 slides up the surface C, as shown in Fig. 7, to resume the position D, it will in turn cause the blade of the propeller to be screwed back into position on its hub against the action of centrifugal force, which in the meantime, for example, could have been lessened by a reduction in speed of rotation of the propeller shaft. When the roller 13 is engaging the D position on the cam 7, the stop 19 is engaged by the stop 18, and the plate 6 ceases to move further. Thereafter, by a release of the brake through the action of the spring or elastic 20, plate 6 is returned to its initial position, that is to say, with the roller 13 engaging the A portion of the cam 7. During the return movement just described, the roller 13 will not follow the cam path through its B and C positions, due to the action of the elastic cord 14, which counterbalancing the action of centrifugal force, holds the roller 13 for the short space of time during which the return movement takes place along a substantially rectilinear course as shown by the dotted line 21 in Fig. 7. Thus, the change from position of least pitch to the position of greatest pitch has been effected by simply braking the movement of the plate 6 after first reducing the speed of rotation of the propeller shaft and thus lessening the action of centrifugal force.

The movements of the blades of the propeller, regardless of their number, may be rendered simultaneous through the use, for example, of a connecting collar 22 provided in turn with a trunnion 23 for each of the blades. On said trunnion is mounted a link 24, which is in turn carried by a further trunnion 25, secured to the collar 8. Thus, movement of the collar 8, as the blade 1 rotates, carries with it through the coupling link mechanism the collar 22 which, in turn, actuates each of the remaining blades through its corresponding link structure.

As just described, the blades of the propeller may be brought into two extreme positions, those of greatest and least pitch, respectively.

In Figs. 8 through 12 the device illustrated enables the blades to be held in addition in intermediate positions. This is accomplished by providing a braking device for holding the plate 6 at the desired position. For example, a brake shoe 41, carried by a rocking arm 42, pivotally secured as at 42A, to the sleeve 43, encircling the propeller shaft, may be provided. Looking at Fig. 9, we note that the rocking arm 42 is not arranged along a radius of the propeller shaft and thus the movement of the plate 6, relative to the sleeve 43, can always take place freely in the direction of the arrow F, whereas, movement in the direction of the arrow F' can only take place when the brake shoe 41 has been backed away from engagement with the plate 6. Such latter movement can be effected by means, for example, of an additional brake member 44, cooperating with a crown 45 secured to the arm 42. Inasmuch as the arm 42 rotates with a continuous movement, together with the sleeve 43 and the shoe 41, a slight braking action on the crown 45 will obtain a rocking movement of the lever 42 about the pin 42A carrying the brake shoe 41 away from the inner edge of the plate 6.

Turning now to the diagrammatic representation of Figs. 10 to 12, it will be noted that in Fig. 10 the plate 6 is shown in the position in which the roller 13 is in contact with the lowest portion of the cam 7, at which time the blade is in its position of greatest pitch. Brakes 40 and 44 are in released position at this point. When the pilot wishes to reduce the pitch, he applies the brake 40 against the plate 6. A relative displacement takes place coincident with such braking between the plate 6 and the shaft 4, as a consequence of which the roller 13 proceeds along the cam surface to the position indicated in Fig. 11. This causes the plate to assume its position of least pitch. It will be understood, in this connection, that when the parts have assumed the position shown in Fig. 11, they are immediately locked in position so that the action of the centrifugal force will not return the blade to its greatest pitch position.

The roller 13 exerts a continuous downward pressure on the cam surface 7 which tends to move the cam and ring to the right or in the direction of the horizontal arrow in Fig. 11. However, the movement of the cam and plate 6 is prevented by engaging it with the brake shoe 41 which locks the parts in position. Consequently, as is shown in Fig. 12, the pilot may cause the blades of the propeller to assume a position between the positions of extreme pitch by manipulating the brake shoes 41 and 44. For example, application of the brake shoe 44 automatically causes a release of the brake shoe 41 and, at the same time, brings the roller 13 down the cam surface 7 through rotation of the latter, for example, to the position occupied in Fig. 12. If desired, the movement of the plate 6 can be facilitated by use of a spring 46 and, in addition, stops 50, as shown in Fig. 9 secured to the sleeve 43, will limit the movement of the plate in both directions by cooperating with the projection 51, carried by the plate 6.

Figure 13:
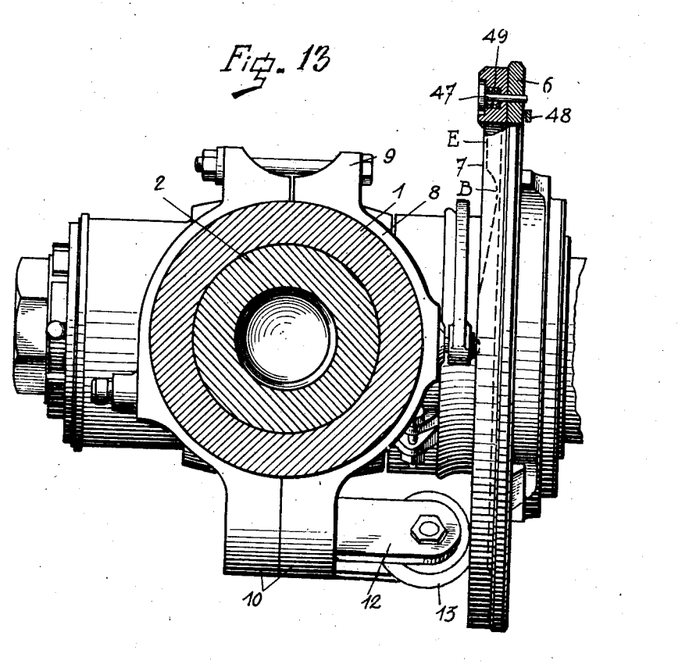
Fig. 13 is a side elevation of the propeller hub embodying the invention partially broken away to show certain details of construction.
Figures 14, 15, 17:
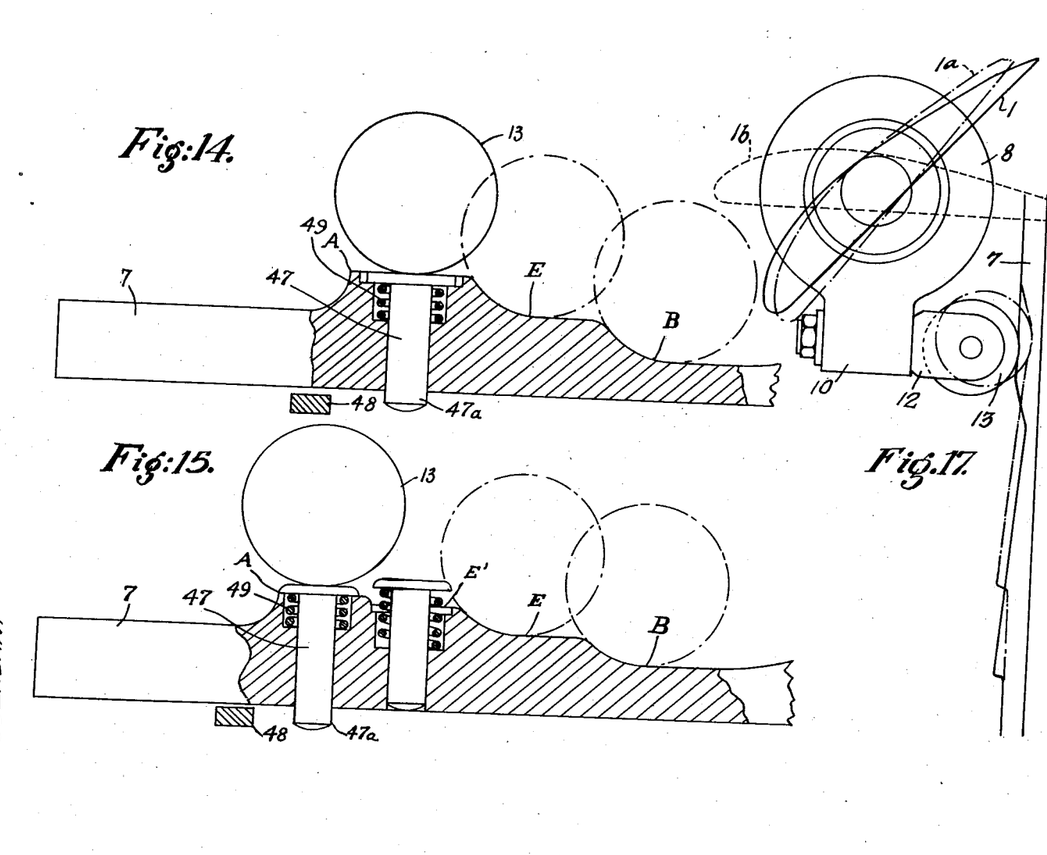
Figs. 14 to 15 show diagrammatically a modification in construction of the propeller.
Fig. 17 is a diagrammatic representation of the modified type of structure illustrated in Fig. 16 showing various pitch positions of the propeller blade.

In Figs. 13 through 15, there is illustrated a modified form of my invention. In these views, the cam surface is provided with three stepped positions which may be assumed by the roller 13. Position A, as shown in Figs. 14 and 15, is the position of least pitch and position B is the position of greatest pitch, while the intermediate position is shown at E.

It will be noted that a bolt 47, having a rounded end portion 47a, is positioned in a recess formed in the cam surface 7 at A and a coil spring 49 is likewise positioned in said recess and tends normally to lift said bolt upwardly above the surface of said cam. A stop 48 is positioned beneath said cam and may be secured to a sleeve encircling the propeller shaft. This stop engages the end of the bolt 47 at 47a when the roller 13 is about to assume the position E on the cam. When the roller 13 is at rest in the E position, the spring 49 lifts the bolt upwardly above the surface of the cam thus retracting the end portion 47a from engagement with the stop 48, and allowing further movement of the plate and cam so that the roller may assume the B position. Due to the rapidity with which the relative displacement of the plate 6 and cam 7 with respect to the roller 13 occurs, in moving the latter from the A to the E position, the bolt 47 comes into contact with the stop 48 before the former has had an opportunity to be projected by means of the spring 49. Sidewise pressure of the bolt 47, through engagement of the domed end 47a against the stop 48, is sufficient to hold the parts in that position against the action of the spring 49, therefore, as long as braking action is maintained causing the displacement of the cam 7, the bolt 47 will remain in contact with the stop 48 and resist displacement.

In operation, when the pilot feels the bolt 47 contact the stop 48, he should immediately release the brake 41 which will allow the spring 49 to project the bolt 47 into inoperative position and out of contact with the stop 48. At this time, the roller 13, which is still firmly pressed against the cam surface 7, will itself act on the inclined portion of the intermediate surface E to displace cam 7 in the same direction and bring it in the first position as shown by the dotted lines in Fig. 14.

In other words, in moving from position A to position E a second stage movement occurs. The first stage embraces the pilot, exerting braking action, which brings the cam surface 7 to a position at which the finger 47 firmly engages the stop 48. The second stage occurs, when the pilot discontinues the braking action and the roller 13 acts to continue the displacement of plate 7 to bring it to position 7.

In Fig. 15 is illustrated the same type of structure, which in this instance enables the plate to be locked in four distinct positions, for which purpose, a second locking member, like bolt 47, is provided.

Figure 16:
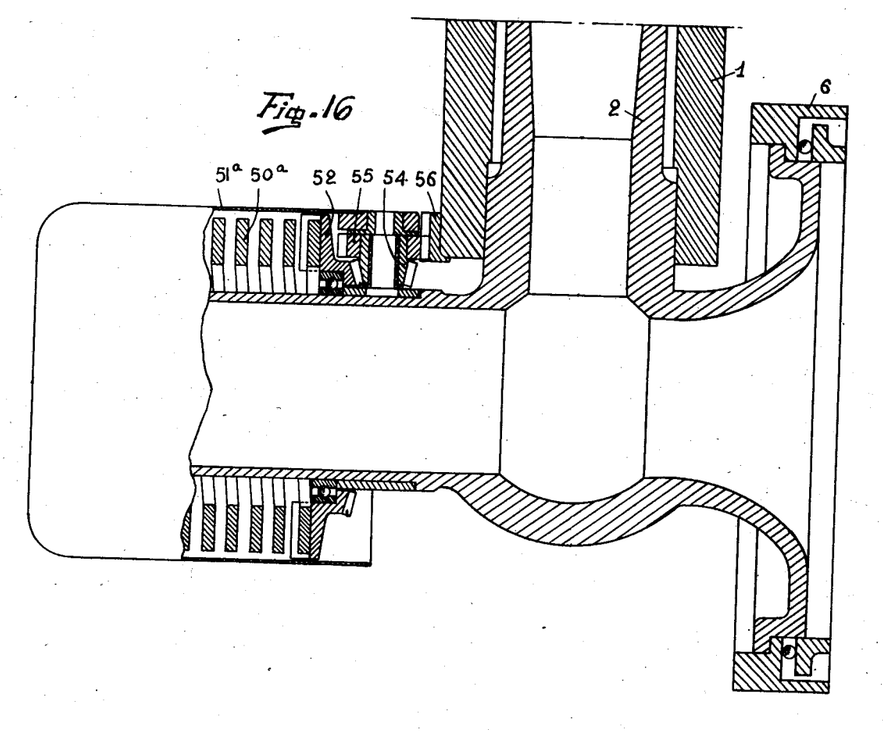
Fig. 16 is a side elevation in partial cross-section of a propeller hub showing a modified form of my invention.

Figs. 16 and 17 illustrate a structural modification of my device as applied, for example, to a three bladed propeller. In this form of the invention, the springs or elastic cords are replaced by a single coil spring 50a, mounted, for example, in a casing 51a in the hub axis. Said spring is secured at its outer end to the hub, and at its inner end to a bevelled pinion 52, which, in turn, meshes with a gear member 54 located below the gear 52 on the same shaft with a further pinion gear 55, which, in turn, cooperates with a tooth segment 56 secured to the hub of the propeller blade. It will thus be obvious, that a force set up in the coil spring 50a, acting through the gear train, will effect a rotation of the propeller blades. The arrangement is similar to the part played by the spring or elastic members 14, in the device heretofore described, in connection with Figs. 1 through 7. However, in this modification, the limitation placed on the angular displacement of the blades, could be greater than in the modification heretofore described.

In Fig. 17, for example, the propeller blade 1 has been shown in full lines in the high pitch position, but by means of the mechanism just described could be brought at will to the position of least pitch, as shown by the dotted lines 1a. If, for any reason, the propeller shaft should cease rotating, the blades could in turn assume the position shown on the dotted lines 1b, at which point, they offer the least resistance to forward motion of the plane. It is also obvious, that the coil spring arrangement lends itself to use in propeller structures of this type, regardless of whether or not, it is desired to permit the blades to be brought into the position of least resistance.

It will be apparent that many changes can be made in the structure and design of my device, without, in the least, departing from the spirit of the invention contained therein.

I claim:
1. A propeller having a pitch which can be the plate to limit the movements of the same with reference to said shaft to a given zone and between two extreme positions, cams secured to said plate and cooperating one with each of said rollers, each of said cams including a projecting flat portion against which the roller bears in one of the extreme positions of the blade, a recess, against the bottom of which the roller bears in the other extreme position of the blade, an intermediate portion arranged between said projecting portion and said recess, a second projecting flat portion and a slope which connects the bottom of said recess to said second projecting flat portion, braking means acting on the plate to cause relative displacement thereof and to successively bring the roller from its position on the first flat portion, to an intermediate position, a retractible bolt for maintaining said roller in such intermediate position, said roller being movable subsequent to the retraction of said bolt to occupy a position within said recess, said roller being thereupon movable to a position upon the second flat portion, and means acting on the plate to retract the same from the later position to its first position subsequent to the cessation of functioning of said braking means.

7. A propeller having a pitch which is variable during flight, comprising a hub, radial bearings secured to said hub, a blade mounted on each of said bearings for rotation about its longitudinal axis in opposite directions, in one of which the blade is constantly urged, during flight, by the forces acting on it, a roller carried by each of the blades, a plate loosely mounted on the propeller shaft, means for restricting the movements of said plate with reference to said shaft to a given zone and between two extreme positions, said plate presenting for each roller, a cam against which the roller is constantly pressed and along which it tends to descend under the action of the forces urging the blade, braking means acting on the plate to cause a relative displacement thereof during which the cam causes the displacement of the said roller against the action of the said forces, automatic locking means acting normally on the plate to prevent its movement in one direction, under the action of the rollers on the cams, but permitting its movement in the opposite direction under the braking action, and means for releasing said locking means to permit the movement in the direction in which it is normally prevented.

8. A variable pitch propeller including a hub, bearings extending radially from said hub, blades rotatably mounted by each of said bearings, said blades tending, during rotation of said hub, to rotate—incident to the forces acting thereon—in one direction, a roller carried by each of said blades, a plate rotatable with respect to said hub and presenting inclined surfaces for each of said blades, said rollers bearing against the plate surfaces, braking means cooperative with said plate to cause relative rotation thereof with respect to said hub whereby to cause the inclined surfaces of said plate to displace said rollers against the action of the forces normally acting on said blades, a brake shoe co-acting with said plate in a single direction of movement of the latter with respect to said hub, a movable drum, a brake co-acting with said drum, and an arm connected to said drum and said brake shoe.

9. A propeller having a pitch which can be varied during flight, said propeller including a hub to be mounted on a propeller shaft, radial bearings secured to said hub, a blade mounted on each of said bearings for rotation in opposite directions about its axis and in one of which directions the blade is constantly urged during flight by the forces acting on it, a roller carried by each of the blades, a plate mounted on the propeller shaft, means confining the movements of said plate to a given zone between two extreme positions, cams secured to said plate and co-operating one with each of said rollers, each of said cams including projecting flat portions against one of which the co-operating roller bears in one of the extreme positions of the blade, a recess against the base of which the roller bears in the other extreme position of the blade, two intermediate portions disposed between said projecting portion and said recess, and a cam portion which connects the bottom of said recess to the second projecting flat portion, braking means acting on the plate to cause a relative displacement thereof and to successively bring the roller from its position on the first flat portion to its first intermediate position, a retractible bolt for maintaining such roller in such intermediate position, said roller subsequent to the retraction of said bolt moving to its second intermediate position, a second retractible bolt for maintaining said roller in such intermediate position, said roller subsequent to the retraction of said second bolt moving to a position within the recess and thereupon to a position on the second flat portion, and means acting on said plate to retract the latter from the last named position to its first position and after the braking means has been rendered inoperative.

PIERRE GEORGES ALBERT LEVASSEUR.